(No Model.)

C. F. JOHNSON.
NUT LOCK.

No. 497,244. Patented May 9, 1893.

Witnesses
L. S. Elliott
E. W. Johnson

Charles F. Johnson
Inventor
by
Attorney

UNITED STATES PATENT OFFICE.

CHARLES F. JOHNSON, OF MILFORD, NEW HAMPSHIRE.

NUT-LOCK.

SPECIFICATION forming part of Letters Patent No. 497,244, dated May 9, 1893.

Application filed October 27, 1892. Serial No. 450,168. (No model.)

*To all whom it may concern:*

Be it known that I, CHARLES F. JOHNSON, a citizen of the United States of America, residing at Milford, in the county of Hillsborough and State of New Hampshire, have invented certain new and useful Improvements in Nut-Locks; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in nut-locks.

The object of the invention is to provide a washer and nut of improved construction, which when applied to the bolt and objects to be connected thereby will securely hold the nut against rotation.

The invention consists in a washer having an aperture with a lug on one side, which is adapted to be used in connection with a nut having a ratchet face, as will be hereinafter fully set forth and particularly pointed out in the claims.

In the accompanying drawings I have shown my invention applied to railway rails having fish-plates, in which—

Figure 1:
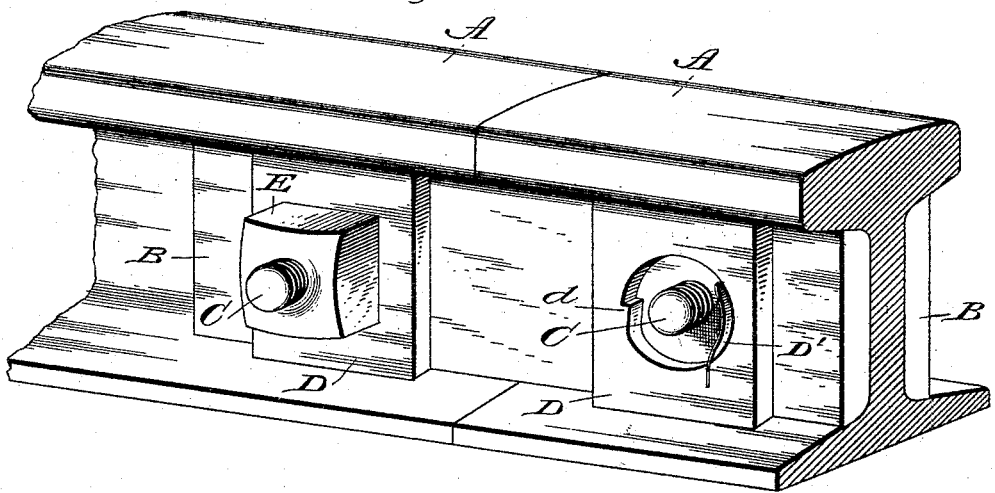
Figure 2:
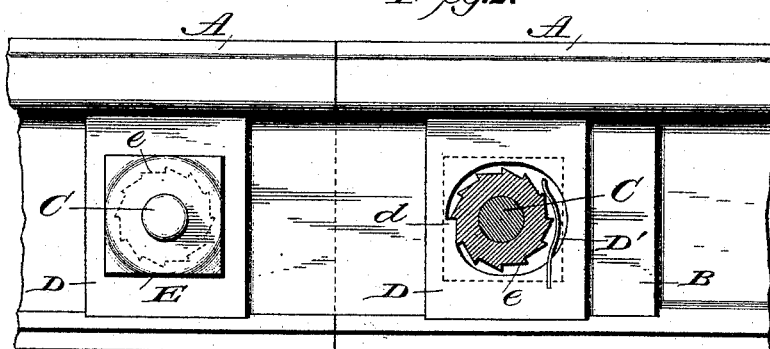
Figure 3:
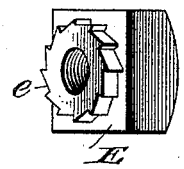

Figure 1 is a perspective view showing the washer and bolt in position with the nut detached. Fig. 2 is a vertical sectional view, the section being taken through a portion of the nut, and Fig. 3 is a perspective view of the nut detached.

A designates the rail, B the fish-plates and C the bolt, all of which are of ordinary construction.

D designates the washer, which is provided with an oval aperture on one side of which is a fixed catch or pawl *d*, and on the opposite side of the aperture from this catch or pawl is a flat spring D'. This spring is preferably a separate piece of metal from the washer, though in some instances it may be struck up from the washer.

E designates the nut the inner face of which is provided with ratchet teeth *e*. The thickness of the projecting portion of the nut upon which the ratchet teeth are formed is slightly greater than the thickness of the washer, so that when the nut is "screwed home" the rear face thereof beyond the ratchet teeth will not bear upon the washer, which will permit the washer to be moved in one direction by the spring and in the other manually when it is desired to release the nut.

In practice when it is desired to hold the nut in place it is simply screwed upon the bolt, which is held against rotation in the usual manner, and the ratchet teeth engaging with the inclined face of the catch or pawl on the washer will move said washer to one side, the spring bearing against the ratchet teeth on the opposite side of the nut causing the rigid pawl to engage the ratchet teeth; thus permitting the nut to be screwed home so that the inner face thereof beyond the ratchet teeth will bear against the fish-plate. When the nut has been screwed home the pawl or catch will engage one of the ratchet teeth and prevent a reverse rotation of the nut. When it is desired to remove the nut it is only necessary to move the washer to one side against the pressure of the spring so as to move the pawl or catch out of the path of the ratchet teeth, when the nut can be unscrewed or taken off.

The device hereinbefore described is simple in construction and can be readily manufactured.

It is obvious that the washer D may be of any suitable construction, and where the edges do not bear against projecting surfaces lugs or teeth can be formed on the rear side thereof so as to hold said washer against rotation.

Having thus described my invention, what I claim as new, and desire to secure by Letters Patent, is—

1. In combination with a bolt and nut, said nut having ratchet-teeth, of a washer D having an aperture of greater lateral diameter than the circumference of the ratchet-teeth on the nut, said washer having on one side of the aperture a catch or rigid pawl and on the other a spring.

2. In a nut-lock the combination of a bolt of ordinary construction, a washer which is adapted to be held against rotation, said washer having an aperture of greater diameter in one direction than the other, a spring located on one side of said aperture and a pawl or catch on the other, of a nut having projecting ratchet teeth, said ratchet teeth being of greater thickness than the thickness of the washer, the spring carried by the washer being adapted to engage with the ratchet teeth so as to move the catch in engagement with the teeth, substantially as shown, and for the purpose set forth.

3. In a nut-lock the combination with the bolt, of a nut having a projecting portion with ratchet teeth formed on the inner face of the nut of a washer having an aperture to receive the ratchet teeth of the nut, which aperture has a projecting portion which is adapted to engage with the ratchet-teeth of the nut to hold the same against rotation, said washer being of less thickness than the projecting portion of the nut, substantially as shown.

In testimony whereof I affix my signature in presence of two witnesses.

CHARLES F. JOHNSON.

Witnesses:
W. H. QUINLAN,
F. B. MCGAFFEY.